United States Patent [19]

Giglia

[11] Patent Number: 5,180,630

[45] Date of Patent: Jan. 19, 1993

[54] FIBRILLATED FIBERS AND ARTICLES MADE THEREFROM

[75] Inventor: Robert D. Giglia, Rye, N.Y.

[73] Assignee: American Cyanamid Company, Me.

[21] Appl. No.: 408,587

[22] Filed: Sep. 18, 1989

Related U.S. Application Data

[62] Division of Ser. No. 918,246, Oct. 14, 1986.

[51] Int. Cl.$^5$ .................. B32B 9/00; B32B 19/00; D04H 11/00
[52] U.S. Cl. .................. 428/224; 162/157.2; 162/157.3; 162/157.4; 428/283; 428/292; 428/293; 428/359; 428/367; 428/408
[58] Field of Search .............. 428/292, 293, 357, 367, 428/359, 408, 364, 224, 283, 289, 174, 372; 162/157.2, 157.3, 157.4

[56] References Cited

U.S. PATENT DOCUMENTS

| | | | |
|---|---|---|---|
| 2,999,788 | 9/1961 | Morgan | 162/157.4 X |
| 4,495,030 | 1/1985 | Giglia | 162/145 |
| 4,565,727 | 1/1986 | Giglia et al. | 428/172 |

Primary Examiner—Lorraine T. Kendell
Attorney, Agent, or Firm—Frank M. Van Riet

[57] ABSTRACT

This invention relates to fibrillated fibers having particular physical characteristics, articles made therefrom as well as methods of producing the same. In particular the fibrillated fibers are defined by their Canadian Standard Freeness in combination with their Tensile Strength when formed into a sheet.

19 Claims, 21 Drawing Sheets

FIBRILLATED FIBERS AND ARTICLES MADE THEREFROM

This is a divisional of co-pending application Ser. No. 06/918,246, filed on Oct. 14, 1986.

BACKGROUND OF THE INVENTION

The fibrillation of fibers, fibrillated fibers and their uses are well-known to those skilled in the art. For example, U.S. Pat. No. 2,810,646 to Wooding et al discloses a water laid web comprising filtered, heat-bonded, water-fibrillated, wet-spun filaments. The filaments are of a polymer selected from the group consisting of polymerized acrylonitrile and a copolymerized mixture of acrylonitrile and up to 15%, by weight, of at least one other monomer copolymerizable therewith. U.S. Pat. No. 4,495,030 to Giglia discloses the use of a fibrillated fiber to provide cohesiveness and support to a wet-laid sheet containing active carbon and submicron glass fibers. U.S. Pat. No. 4,565,727, also to Giglia, discloses the use of a fibrillated fiber to provide cohesiveness and support to a wet-laid sheet containing active carbon in the form of carbon fibers and carbon particles.

Various nonwoven structures using a fibrillated acrylic fiber were disclosed in Giglia et al; *Novel Nonwoven Activated Carbon Fiber Papers* presented to a meeting of the American Chemical Society in April of 1984.

Recently, there has been much interest in the possible use of nonwoven fabric technology to produce paper and felt like structures containing activated carbon for use in chemical protective clothing and filtering applications including both gas and liquid filtering. The aforementioned Giglia paper described several nonwoven adsorptive felt like structures having loadings of activated carbon fibers or powders. In that paper it was disclosed that a fibrillated acrylic fiber, produced according to the process set forth therein, was useful in permitting high loadings of filler materials, such as activated carbon fibers and powders in the nonwoven fabric while maintaining good wet strength and chemical resistance.

While many binding agents have been available in the past, fibrillated fibers are becoming of interest as they provide fine diameter fibrils as opposed to those of heavier spun fibers. Generally, spun fibers are produced in sizes of ten microns or greater while it has been the experience that sizes of less than a micron (cross section) are required to entrap and bind fine particles in nonwoven and other composite structures. Need exists now, however, for binders which provide such entrapment properties which also provide reinforcement and strength to composite constructions. While the fibrillated fibers of the prior art have provided adequate and improved characteristics, recognized needs for further improvement in this field are apparent and a welcome contribution to the art would be a fibrillated fiber having highly desired physical characteristics of low Canadian Standard Freeness in combination with relatively high Tensile Strength. Heretofore, the limits of these properties in the area of acrylic fibers has been such that fibrillated acrylic fibers have not been available with a Canadian Standard Freeness below about 200 and certainly not available in combination with a useful Tensile Strength such that the material could be processed on conventional nonwoven fabric lines. These and other shortcomings of the prior art have been remedied by the discovery of the instant invention which will be described herein as follows.

SUMMARY OF THE INVENTION

The instant invention provides for a fibrillated fiber wherein said fiber has a Canadian Standard Freeness (CSF) of less than 200 in combination with a Tensile Strength (TS), as will be defined herein, of at least 5 pounds per inch and preferably a CSF of less than 100. A preferred base fiber is of an acrylic nature with especially desirable fibers having acrylonitrile contents of at least 85% (based on weight of acrylonitrile monomer content to total monomer content of the prepolymerization mixture). Particularly useful, fibers have polyacrylonitrile content in excess of about 89% and more preferably, between 89 and 90% on the same basis as set forth above. The preferred comonomers comprise methyl methacrylate which is preferably present at levels of at least about 10% by weight as discussed above. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation.

Extremely useful, fibrillated fibers and preferred for certain uses include fibers having a CSF of less than about 50 and/or a TS of at least about 7 pounds per inch. Fibrillated fibers having CSF of less than about 25 are very desirable providing fabrications of extreme utility.

Included within the scope of the invention are nonwoven fabrics made with the fibers summarized above and in particular, nonwoven fabrics further comprising a toxic vapor absorptive agent including, but not limited to, activated carbon. In several uses said activated carbon can comprise activated carbon fiber alone or in combination with a powder form present in said fabric at levels of up to about half the weight of the fabric, i.e. the total fabric including all components including the activated carbon. Such fabrics can further comprise other fibers including, but not limited to, up to about two fifths, by weight, of glass fibers. In cases where CSF values for the fiber are less than 100, amounts of activated carbon as described above may conveniently exceed half the weight of the fabric and in fact, can preferably exceed more than three quarters the weight of the fabric and more desirably in excess of about six sevenths and seven eighths, by weight, of the fabric.

Preferable fabrics independent of their composition are permeable to air and water vapor and provide improved components for such things including, but not limited to, breathing masks, garments and filtration systems.

Generally, sheets comprising about 5% to about 65%, by weight, of the fibrillated fiber can be used to bind powders, flakes and fibers of various sources and descriptions. These materials include, but are in no way limited to, the activated carbon materials discusses above as well as other synthetic (organic and inorganic, i.e. glass, silicon, boron or the like) and natural fibers, powders, metallics, minerals and the like. These materials may be in sheets or may also be in the form of pellets or, for example, pressed powders or any other form whereby the inclusion of the fiber provides improved integrity of structure.

DESCRIPTION OF FIGURES

Figure 1:
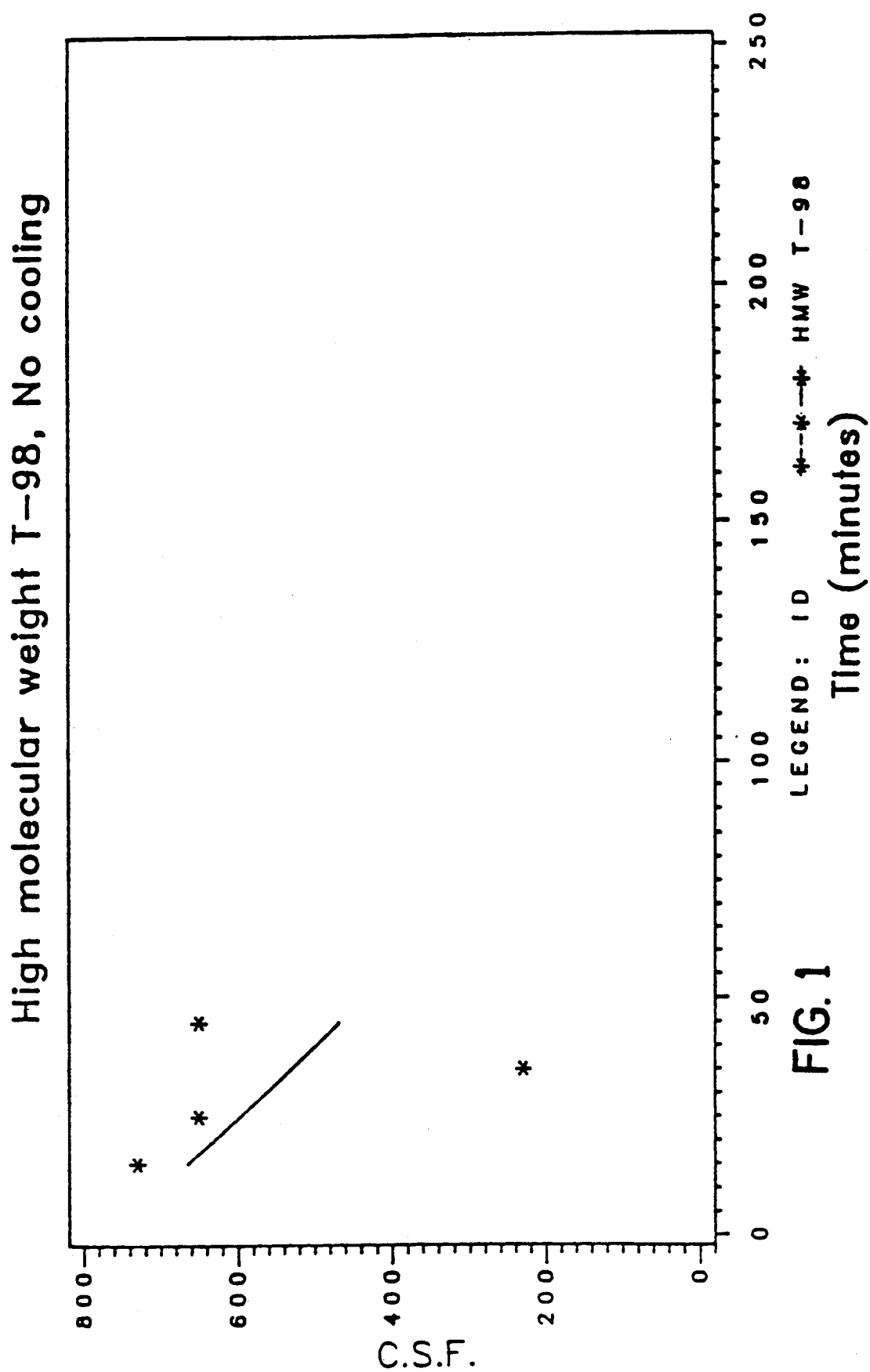
Figure 2:
Figure 3:
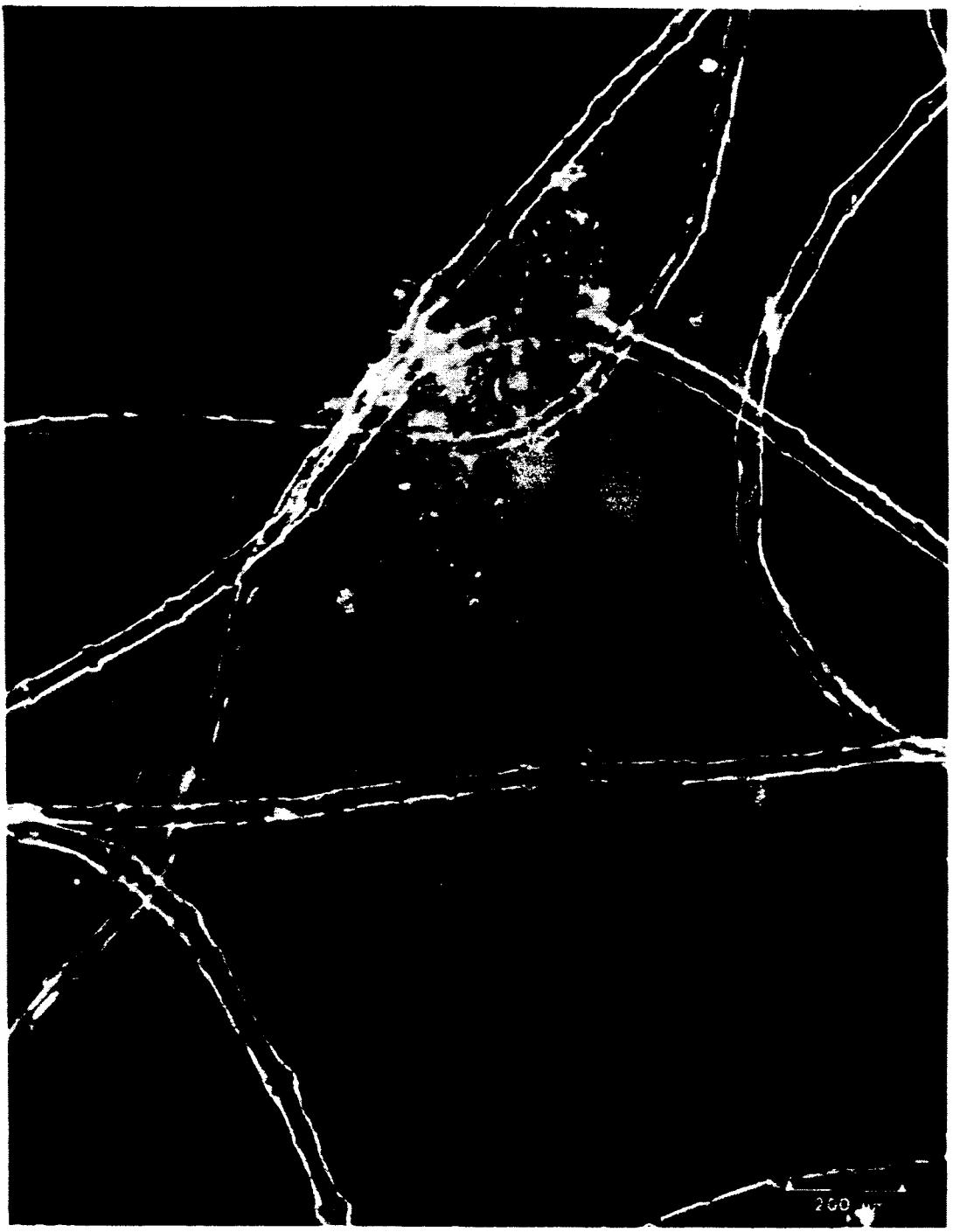
Figure 4:
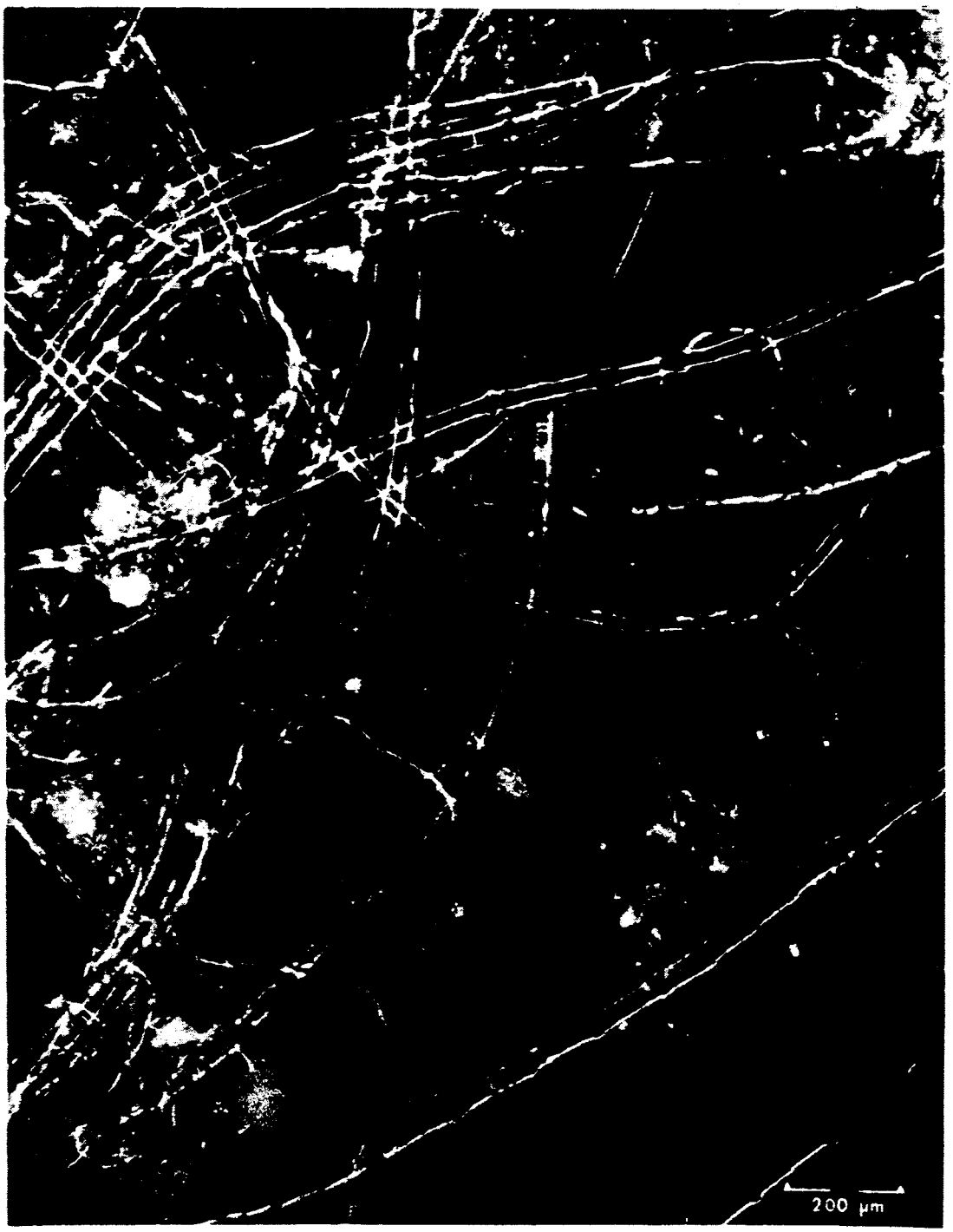
Figure 5:
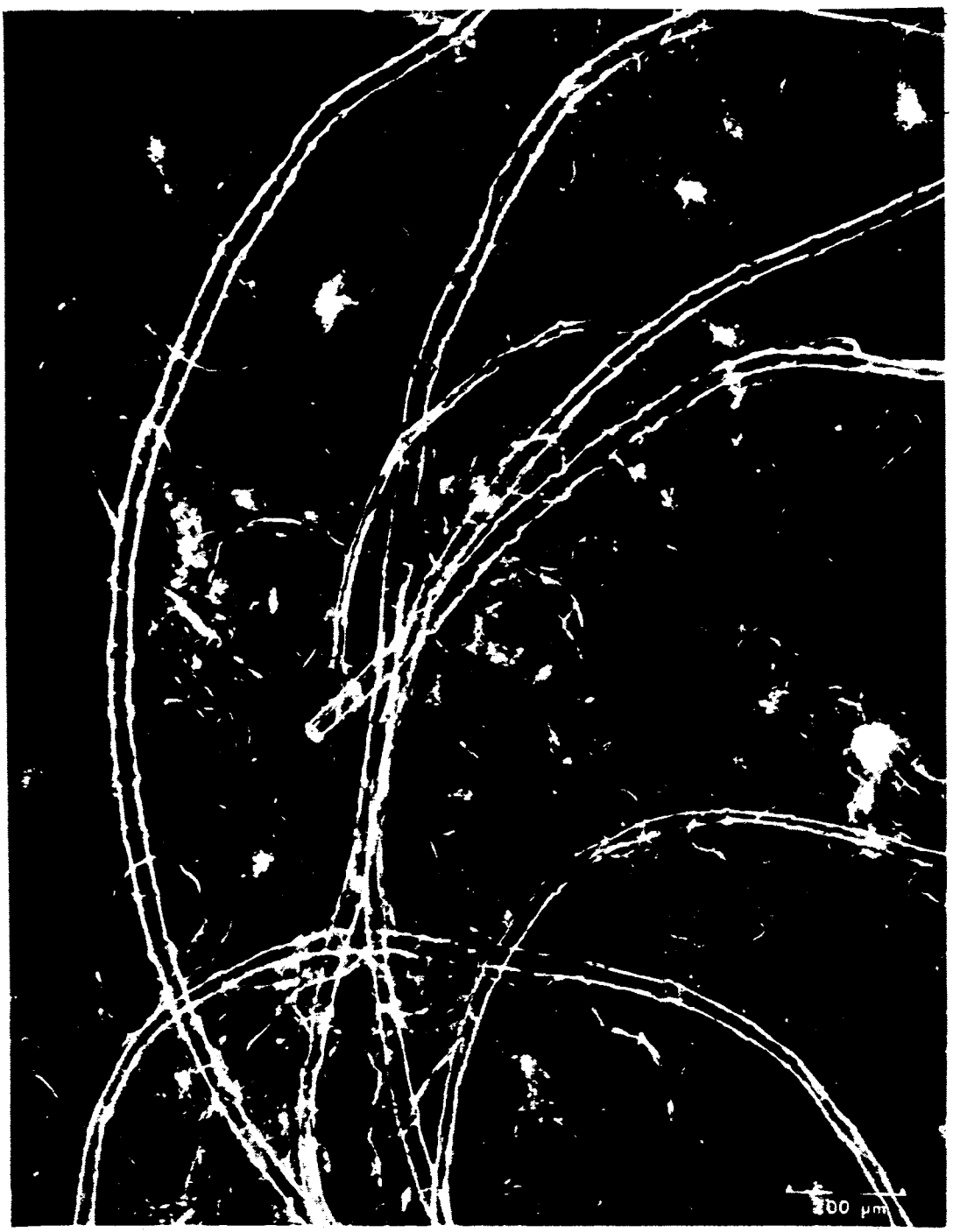
Figure 6:
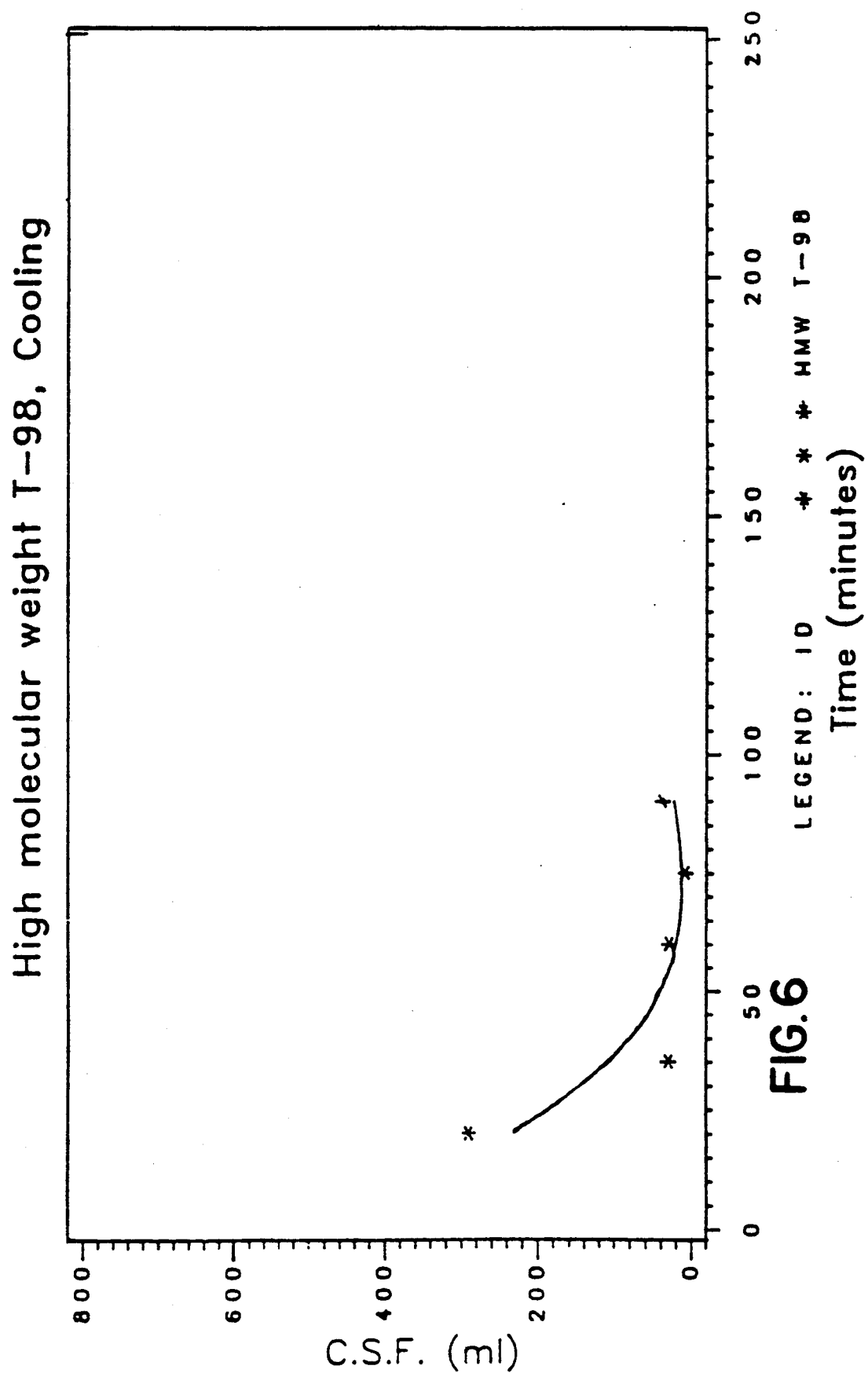
Figure 7:
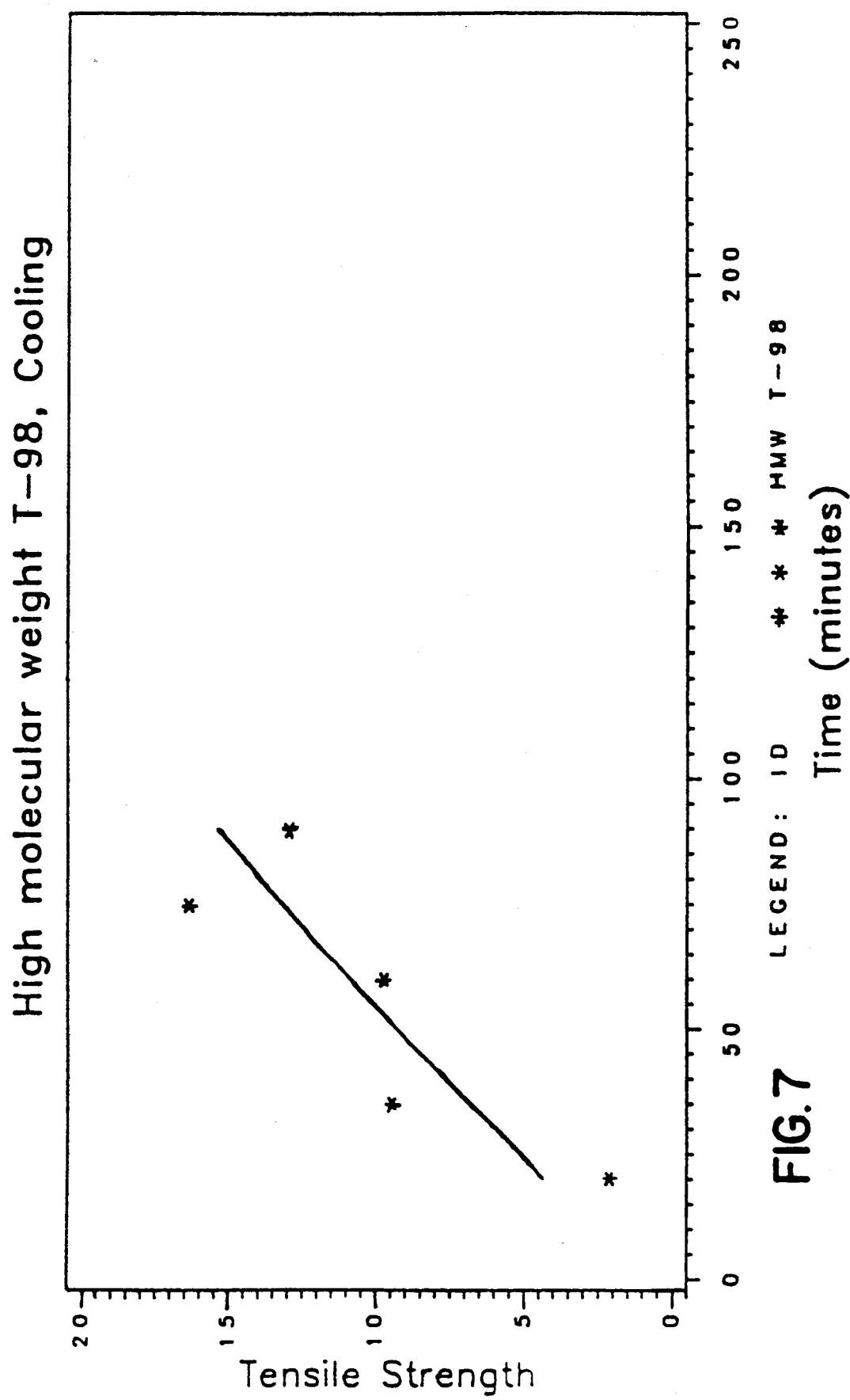
Figure 8:
Figure 9:
Figure 10:
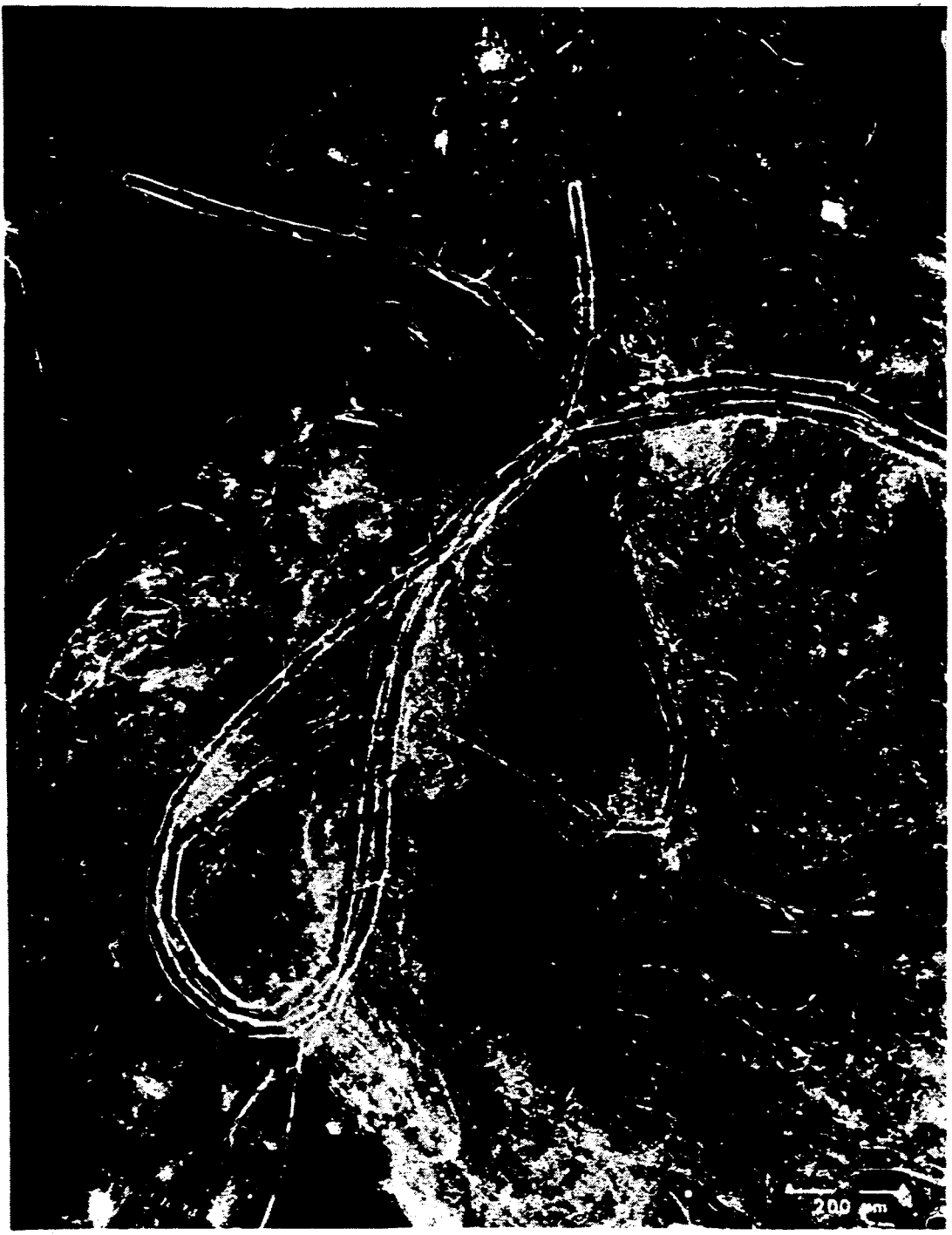
Figure 11:
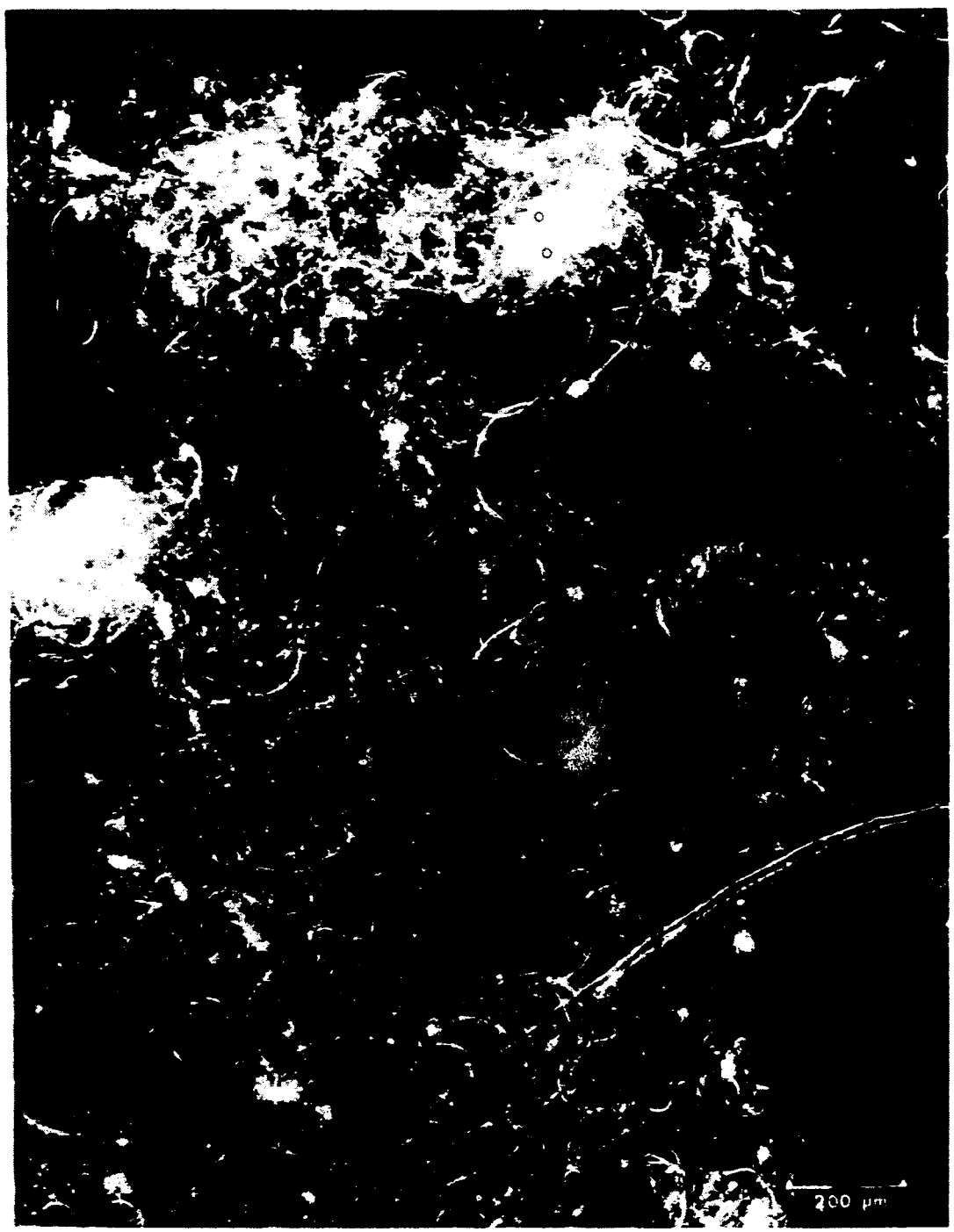
Figure 12:
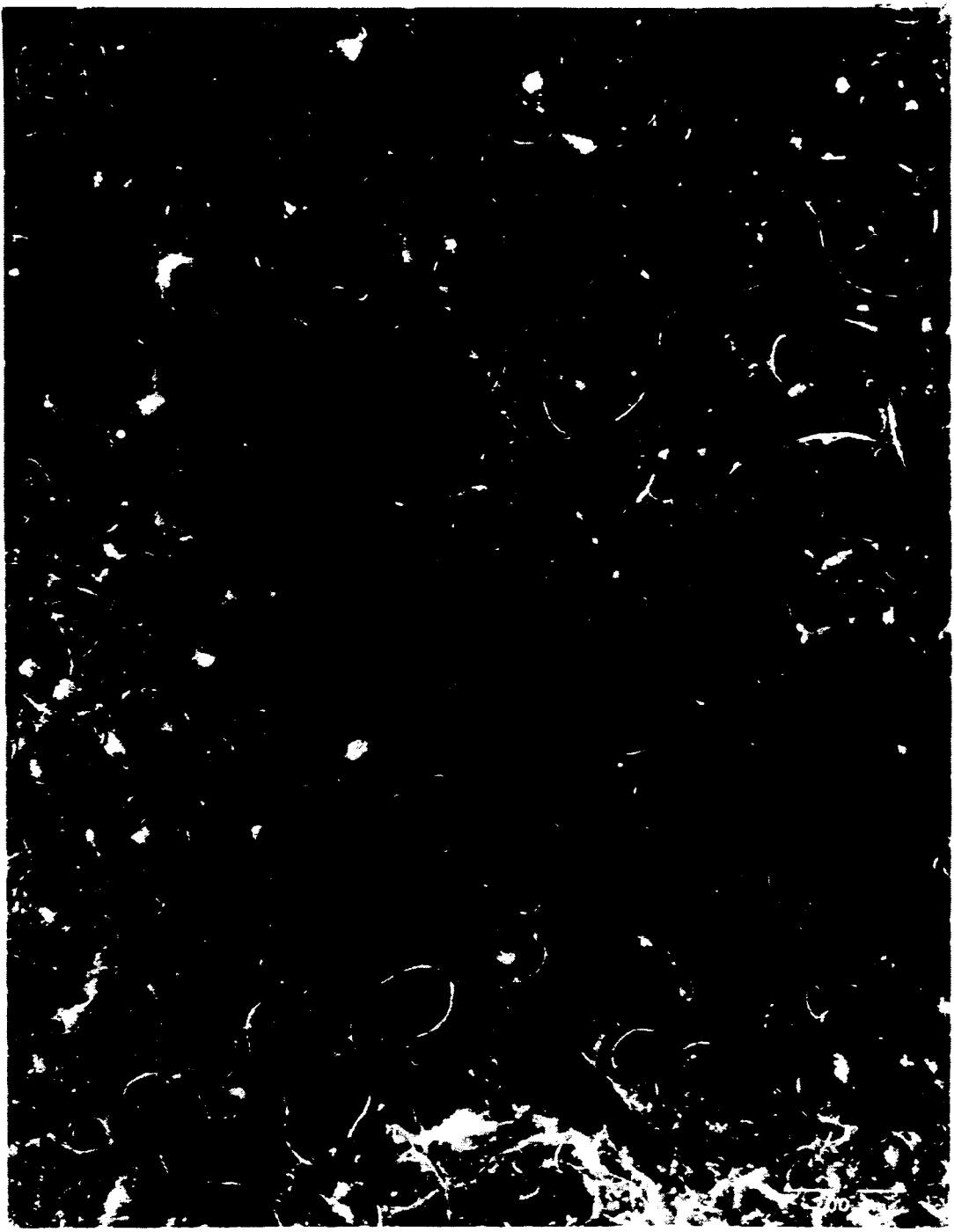
Figure 13:
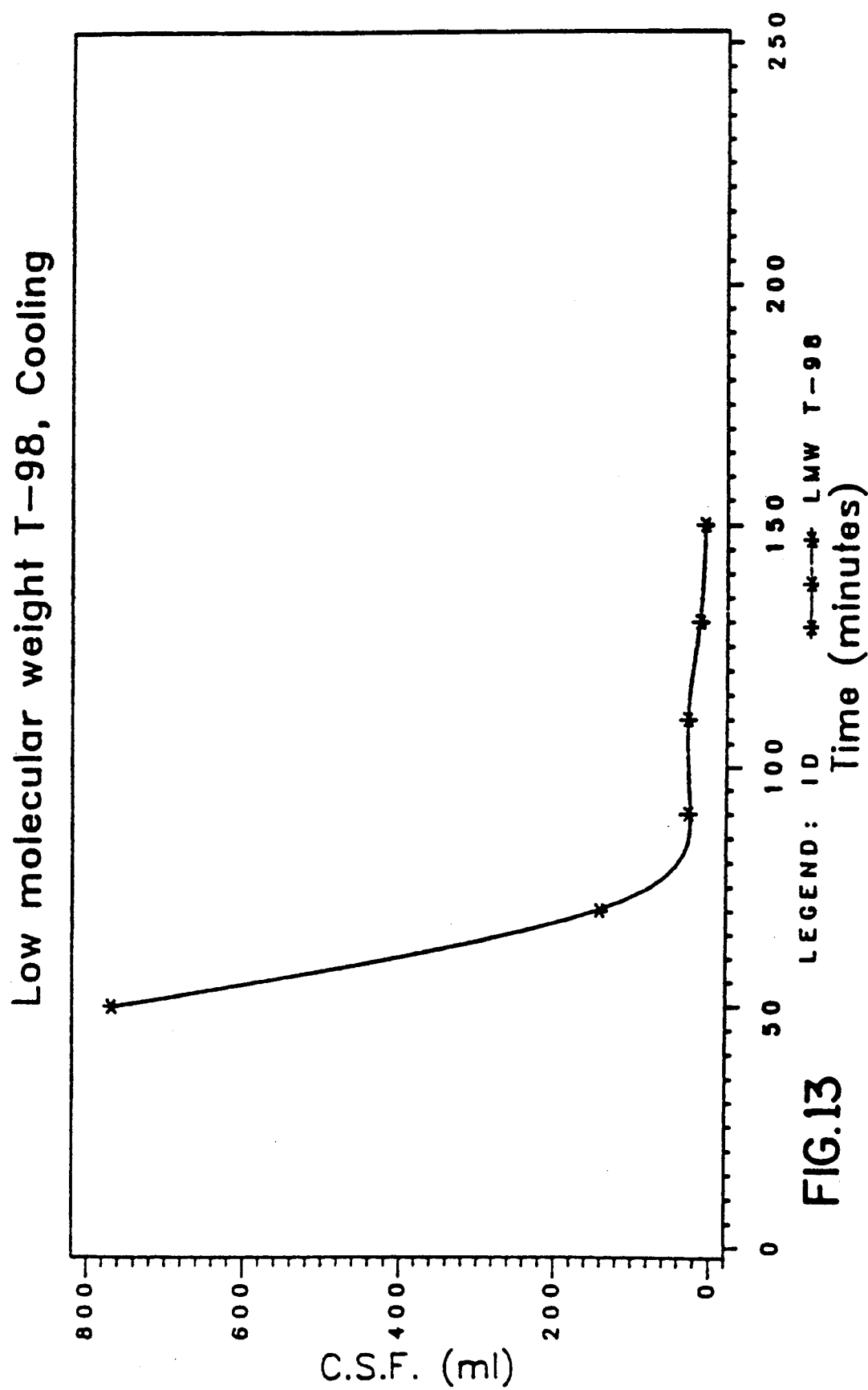
Figure 14:
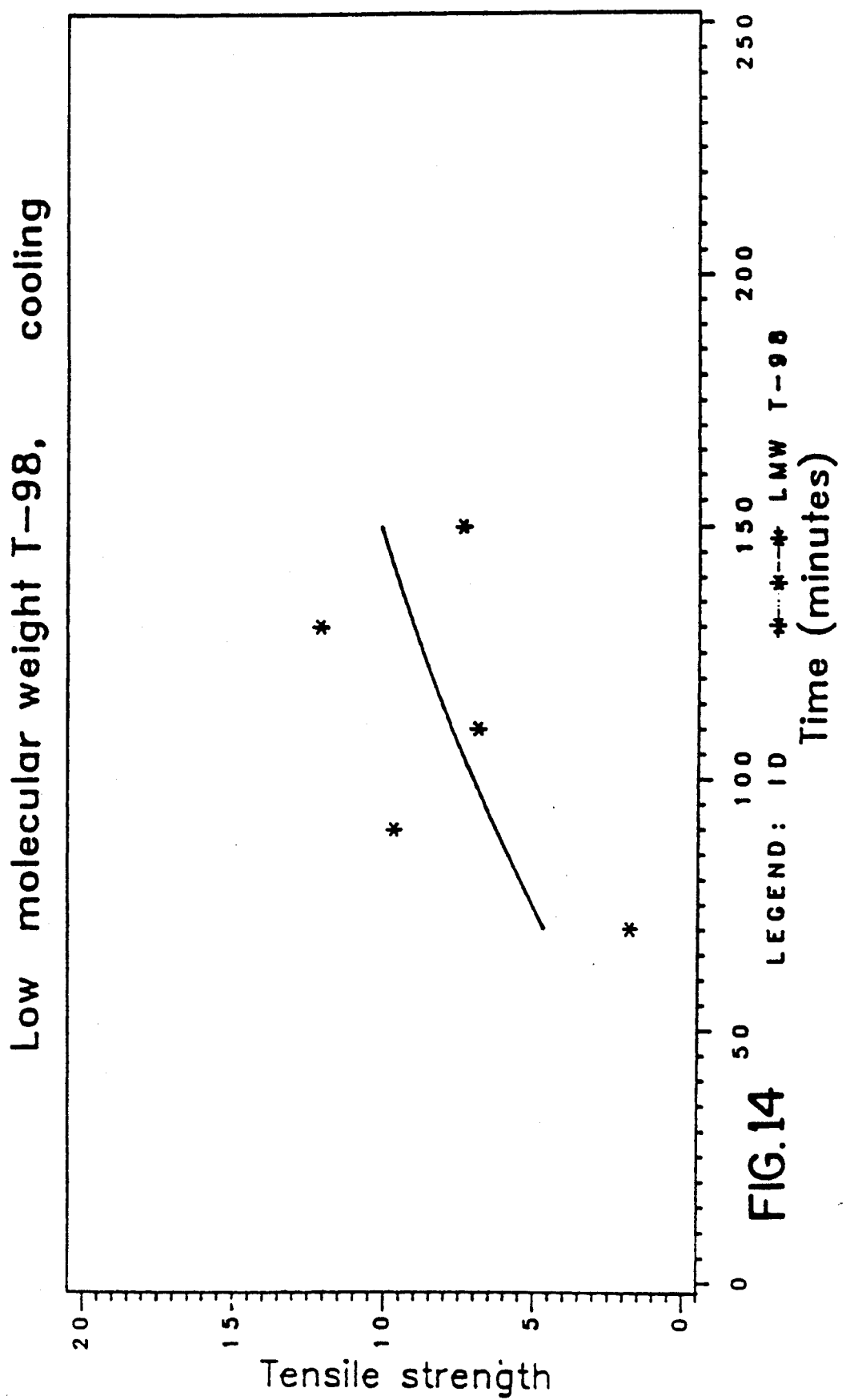
Figure 15:
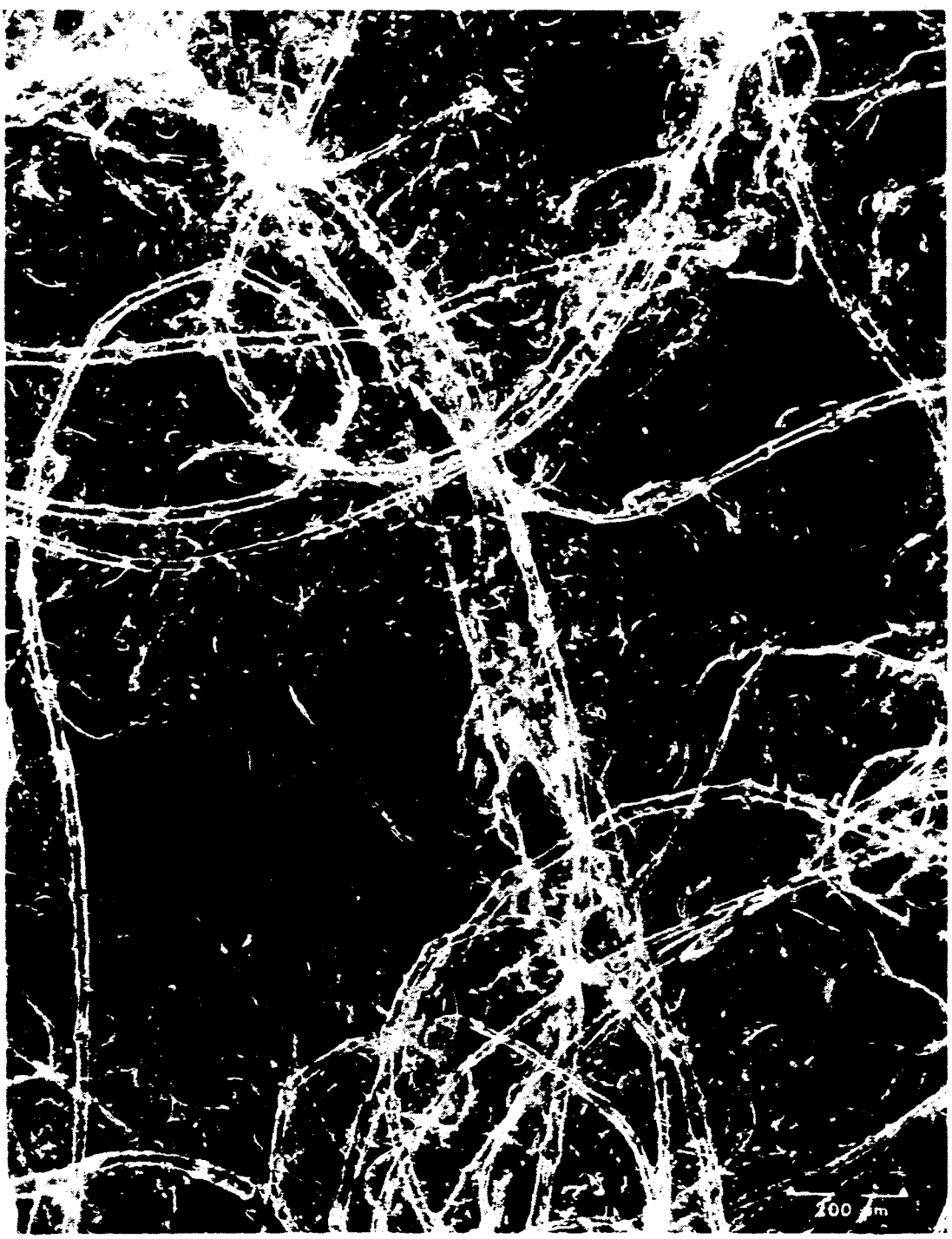
Figure 16:
Figure 17:
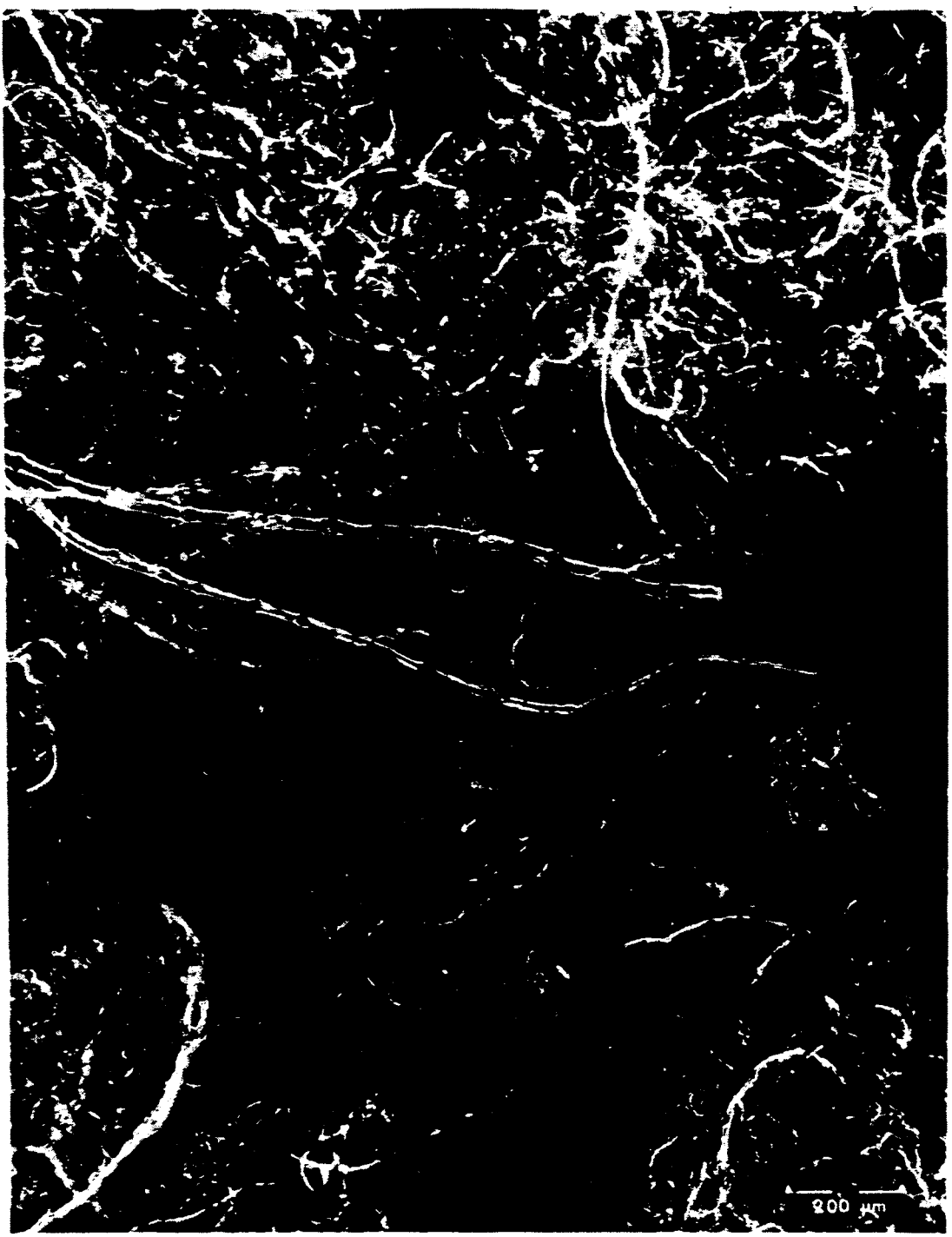
Figure 18:
Figure 19:
Figure 20:
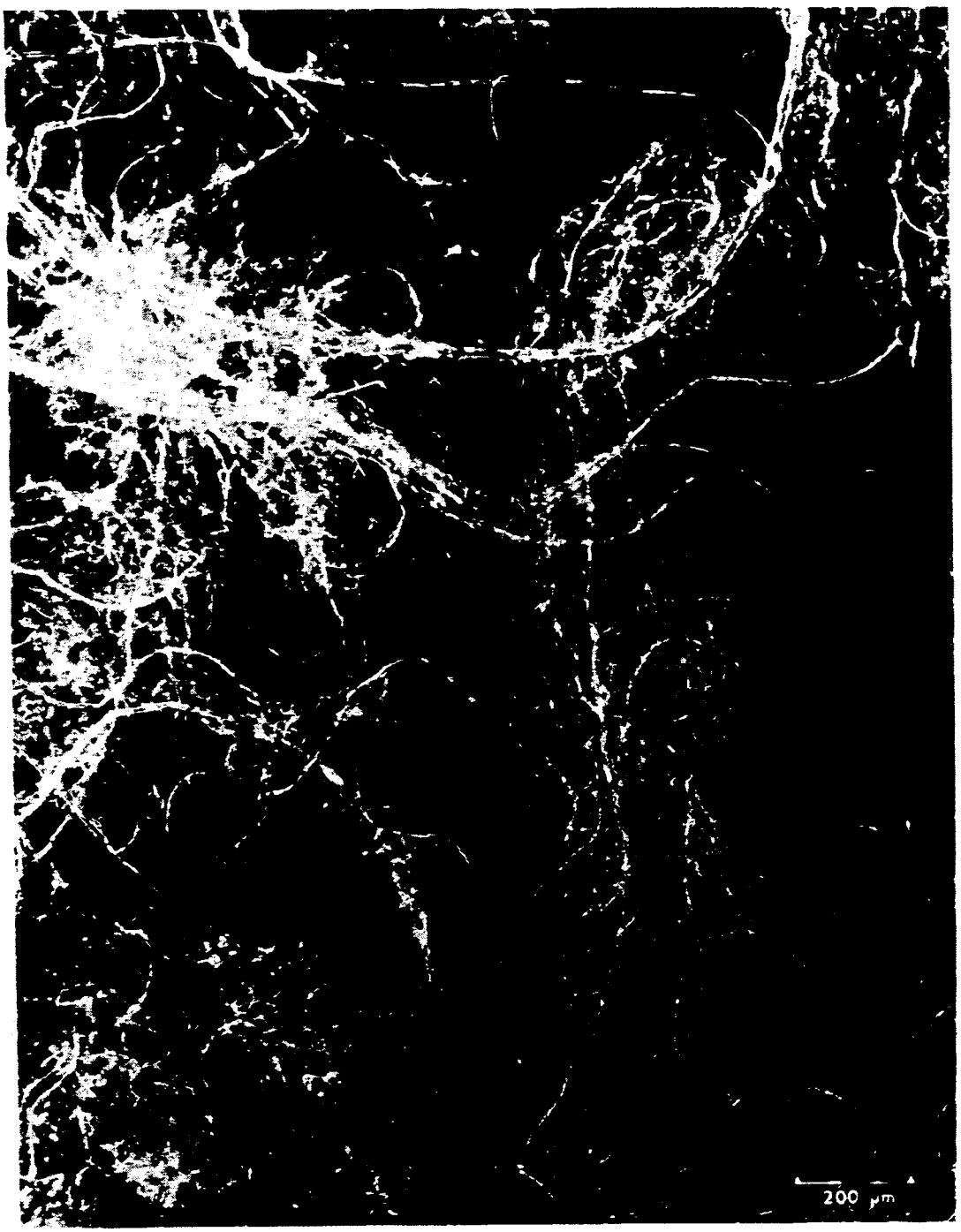
Figure 21:
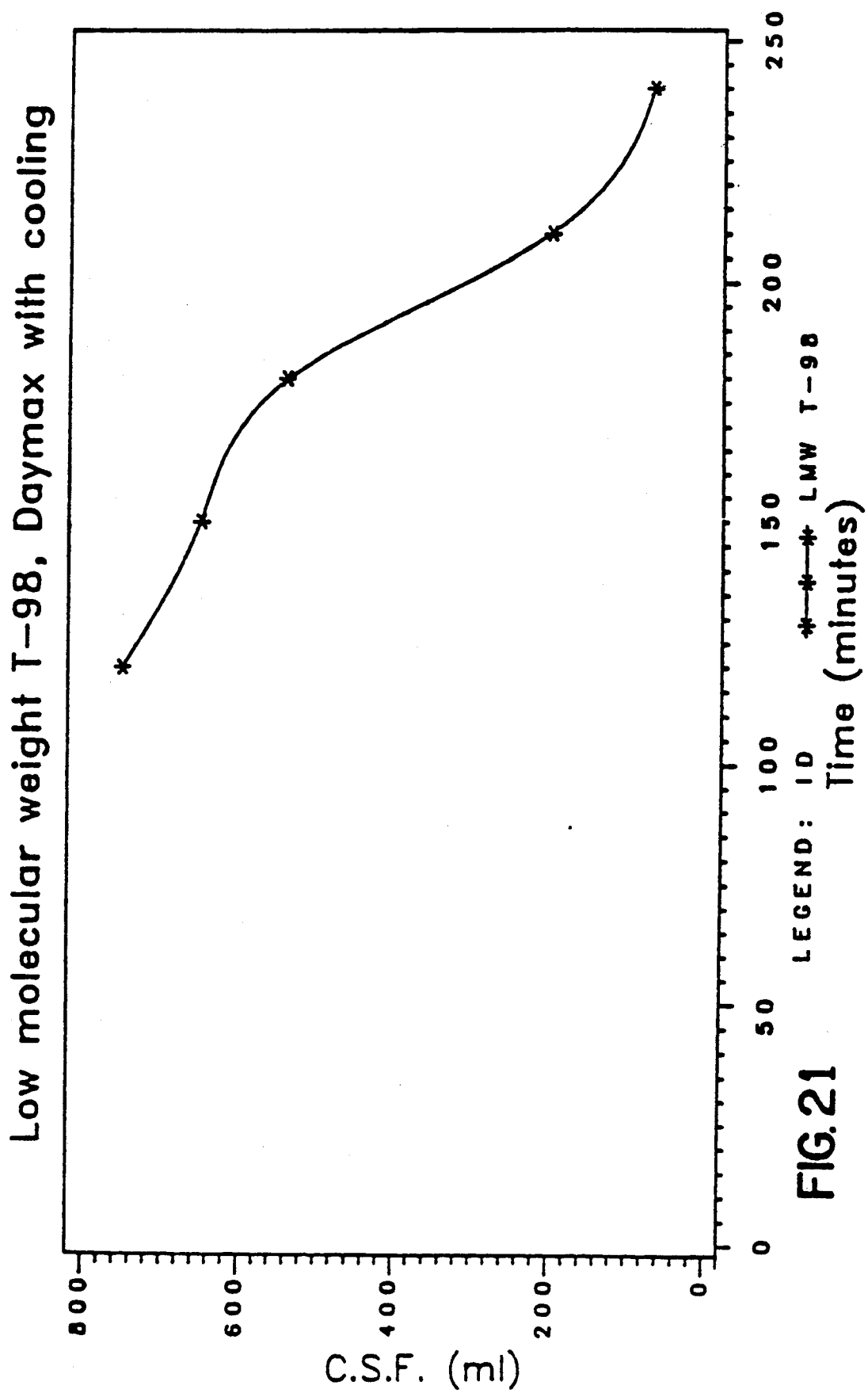

| | DESCRIPTION OF FIGURES | |
|---|---|---|
| FIG. 1 | Graphic Representation of Data of Example 1 | CSF |
| FIG. 2 | Photomicrograph Example 1 Representative Fibers | 15 min. |
| FIG. 3 | Photomicrograph Example 1 Representative Fibers | 25 min. |
| FIG. 4 | Photomicrograph Example 1 Representative Fibers | 35 min. |
| FIG. 5 | Photomicrograph Example 1 Representative Fibers | 45 min. |
| FIG. 6 | Graphic Representations of Data of Example 2 | CSF |
| FIG. 7 | Graphic Representations of Data of Example 2 | TS |
| FIG. 8 | Photomicrograph Example 2 Representative Fibers | 20 min. |
| FIG. 9 | Photomicrograph Example 2 Representative Fibers | 35 min. |
| FIG. 10 | Photomicrograph Example 2 Representative Fibers | 60 min. |
| FIG. 11 | Photomicrograph Example 2 Representative Fibers | 75 min. |
| FIG. 12 | Photomicrograph Example 2 Representative Fibers | 90 min. |
| FIG. 13 | Graphic Representation of Data of Example 3 | CSF |
| FIG. 14 | Graphic Representation of Data of Example 3 | TS |
| FIG. 15 | Photomicrograph Example 3 Representative Fiber | 50 min. |
| FIG. 16 | Photomicrograph Example 2 Representative Fiber | 70 min. |
| FIG. 17 | Photomicrograph Example 2 Representative Fiber | 90 min. |
| FIG. 18 | Photomicrograph Example 2 Representative Fiber | 110 min. |
| FIG. 19 | Photomicrograph Example 2 Representative Fiber | 130 min. |
| FIG. 20 | Photomicrograph Example 2 Representative Fiber | 150 min. |
| FIG. 21 | Graphic Representation of Data of Example 4. | |

DETAILED DESCRIPTION OF THE INVENTION

The fibrillated fibers of the instant invention comprise in combination a Canadian Standard Freeness of less than 200 in combination with a Tensile Strength of at least 5 pounds per inch as will be hereinafter defined.

Canadian Standard Freeness is measured as is described in a test set forth in an article entitled "The Determination of Freeness" Standard C.1, Approved Method, October 1940, Revised May 1952, October 1962, September 1967, June 1969 and April 1972, prepared by the Physical and Chemical Standards Committee, Technical Section, Canadian Pulp & Paper Associates.

Tensile Strength is measured according to Federal Standard 191A TM 5100 as follows:

0.63 g (Dry Weight) of the fibrillated fiber is slurried in 200 ml of water. This slurry is then added to a 12.5 cm ID Buchner funnel containing a liner of No. 1 Whatman filter paper. Vacuum is used to form a test sheet on the filter paper layer. The test sheet is then separated from the filter paper support and is dried to constant weight in an air oven at about 110° C. The resulting sheet is then cut into 1.0 inch strips which are evaluated for tensile strength to break according to Federal Standard 191A TM 5100.

Preferably, fibrillated fibers having a CSF of below 100 and/or a Tensile Strength of at least 7 pounds inch are particularly useful, and fibers having CSF values below about 50 and 25 are found to have desirable and very desirable characteristics, respectively.

With regard to the fiber from which these fibrillated fibers are made, acrylic based fibers are preferable. In particular, those in which the acrylonitrile monomer contribution is at least 85%, by weight, of the fiber. By monomer contribution is meant the weight of the monomer employed in the reaction mixture based on the total weight of all monomer contained therein just prior to initiation of the polymerization. Fibers with higher acrylonitrile monomer contribution are particularly preferred. Acrylic contents in excess of 89% are desirable and particularly preferred are compositions where the content is about 89 to 90 percent. While any compatible comonomer may be used, methyl methacrylate has been found to be particularly suitable especially when its monomer contribution is at least 10%, by weight. Inclusion of other comonomers can be made with simple experimentation based on the ancillary properties that they can provide provided that their inclusion does not materially detract from the ability to achieve the aforestated CSF and TS values critical to the instant invention. Without wishing to be bound by the theory, it is believed that fibers useful in producing the fibrillated fibers of the instant invention are those wherein the comonomer mix provides a fiber having lateral weakness and longitudinal strength. When using acrylic fibers, the preferred form of the invention the fibrillated fiber precursor can be made by conventional wet-spinning methods. In the best mode contemplated at the time of the filing of this application; wet-spun, gel, hot-stretched and uncollapsed acrylic fibers comprising about 90%, by weight, and 10%, by weight, acrylonitrile and methyl methacrylate monomer contributions are employed. Specifically, contemplated comonomers that also may be useful include other similar acrylates, such as, for example, ethyl acrylate. Similarly, homopolymers and copolymers of other fiber forming monoethylenically unsaturated monomers, such as vinylacetate, vinyl chloride, styrene, vinyl pyridine, acrylic esters, acrylamide and the like are within the scope of materials contemplated herein. Examples of still other copolymerizable monomers which are contemplated include those as described in U.S. Pat. No. 3,047,455.

The fibrillated fibers of the instant invention can be made using a modified commercial blender. In general, it has been found advantageous to use a modified Waring brand commercial blender wherein the as supplied blade has been modified to provide a break edge of about 0.25 mm on the working edge. In operation a relatively dilute slurry or precursor fiber in water is introduced into the blender device which is then run for about at least one-half hour to about at least one hour depending upon the molecular weight of the fiber being used. With acrylic fiber having what is considered a high molecular weight, i.e. ca. 58,000, a process time as short as one-half hour was found to be adequate while with a material of what is considered a low molecular weight, i.e. ca. 49,000, a minimum of about an hour was required. For the invention the exact time of processing is not critical and will vary with the character and make-up of the precursor, i.e. molecular weight and monomer content and will be easily determined in view of this disclosure by simple experimentation. What has been found to be critical was control of the temperature of the slurry while it was being processed. In prior art techniques, and as will be demonstrated in the Examples to follow, no attention was paid to the heat of the slurry mixture. Irrespective of the normal starting temperatures, i.e. room temperature, the mechanical action of the processing resulted in imparting heat energy to the slurry and slurry temperatures in excess of about 50° C. were experienced. Fibers produced thusly had CSF levels of about five-hundred to seven-hundred, and values of less than that were unable to be achieved prior to loss of useful Tensile Strength as defined by these improved fibers. Importantly, it was discovered that by providing means to maintain the temperature of the slurry in a lower range that the fibrillated fibers of the instant invention were obtainable for the first time. In general, slurry temperatures, when using this technique maintained below about 30° C., produced fibers within the scope of the instant invention. It is contemplated within the scope of the invention that variation of the slurry temperature in and around 20°-30° C. using the aforedescribed technique alone or in combination with variations of slurry solids content will enable infinite variation of the critical parameters of CSF in combination with TS as may be required for the end use of the fibrillated fiber.

It is recognized that use of the commercial blender as described above is somewhat limited with regard to the amount of the fiber of the invention which can be produced in any one batch. It has been found that larger amounts of the material can be produced using larger equipment. It is cautioned that many conventional cutting and beating devices have been attempted to date that do not produce fiber within the scope of that of the instant invention. It has been found that when a Daymax brand 10 gallon mixer was modified as per the modification on the smaller Waring device (i.e. ~0.25 mm break edge modification) 0.7% slurries of precursor maintained below 30° C. and processed for about four hours produced fibrillated fiber within the scope of the invention.

Optionally, it has been found that use of a dispersant during processing, such as, for example, Aerosol® OT-75, as available from American Cyanamid Company, Wayne, N.J., or any similar such material facilitates the processing. The exact blending parameters or the equipment employed are not limiting with regard to the scope of the invention and it is contemplated that such may be varied and modified with simple experimentation by one skilled in the art in view of this disclosure.

In accordance with the present invention, there is also provided an improved fabric comprising said fibrillated fiber alone or in combination with preferably a toxic absorbing agent or filtration material. In uses where said fabric will act as an element in a filtration system, it is preferable that said fabric be permeable to air and water vapor. Included within the scope of the filtration and toxic absorbing agents are activated carbons either in fiber or powder form or in mixtures thereof either alone or in combination with other agents. In one preferred mode the improved products of the present invention are prepared by wet-laying the activated carbon fibers, activated carbon particles and fibrillated acrylic fibers from a water suspension thereof. The suspension should contain from about 1-15%, by weight, based on the total weight of fibers and particles, preferably from about 1-5%, by weight, of the fibrillated acrylic fibers, from about 6-75%, by weight, same basis, preferably from about 10-65%, by weight, of the activated carbon fiber and from about 15-85%, by weight, same basis, preferably from about 20-70%, by weight, of the activated carbon particles, the total weight of the three components being 100%.

The activated carbon particles, activated carbon fiber and fibrillated acrylic fiber are wet-laid using the conventional paper-making process well known in the art. Flocculating agents and surface active agents can be incorporated into the water suspension in order to facilitate the paper-making procedure as is also known in the art. The bulk of the acrylic fibrillated fibers should range from about 1 mm to about 10 mm in length.

The activated carbon fibers are also well known in the art as are methods for their production. They can be used in lengths of from about 0.3 to about 15.0 mm, preferably from about 0.5 to about 10.0 mm, and can be prepared from such carbon fiber precursors as coal tar pitch, petroleum pitch, coal tar, petroleum derived thermal tar, ethylene tars, high-boiling coal tar distillates, ethylene tar distillates, gas oils or polynuclear aromatics. Also useful as precursors are polymers, such as acrylonitrile homopolymers and copolymers, polyvinylalcohol, phenolic-aldehyde and natural and regenerated cellulose. Methods for preparing activated carbon fibers useful herein are disclosed in U.S. Pat. Nos. 4,069,297 and 4,285,831, which patents are hereby incorporated herein by reference.

The activated carbon powder or particles have a particle size ranging from about 0.1 to about 500 $\mu$m, preferably from about 1.0 to about 80 $\mu$m and are also prepared from any of the carbon precursors described above.

The wet-lay sheet making process (paper making) used herein for the production of the novel fabric material of the present invention results in a product having unique sorptive characteristics, a thickness of at least about 0.005 inch, preferably at least 0.01 inch, a high sorptive capacity to weight ratio and high porosity to fluid flow. The equilibrium loading of absorptive carbon fiber is higher than conventional activated carbon powder products. The products of the present invention are more porous than sheets containing only carbon particles. The carbon fiber, which tends to lay parallel to the plane of the sheet, produces a longer fluid flow path through the sheet which increases the time available to adsorb impurities. The novel products hereof accept an unexpectedly high additional loading of active carbon powder. The combination of active carbon fiber and active carbon particles results in a higher performance versus cost ratio than sheets which contain only one of these active ingredients.

The surface of the novel fabric material of the present invention may be embossed during or after its production to improve sheet flexibility and/or porosity. The novel nonwoven fabric material may be laminated to a woven, nonwoven, knitted etc. backing, such as matts, felts, papers, etc. produced from cotton, hemp, flax, ramie, jute, silk, wool, leather, flannel, flannellette, swansdown, poplin, cellulose ethers or esters, nylon, rayon, acetates, polythene, glass, rock wool, asbestos, in order to strengthen the material.

Lamination of the novel products hereof to the above-mentioned backing materials may be achieved by the use of water vapor and air permeable adhesives, preferably those available in the form of foams, such as rubber or acrylic latexes, polyurethanes and the like.

These adhesives are self-adhering and upon curing foam and set into strong bonds.

The surface of the novel fabric material claimed herein may be rendered hydrophobic by coating with a porous silicone film or a polymer, such as polytetrafluoroethylene. Additionally, a reactive coating capable of decomposing toxic agents, e.g. a coating of a sulfonated polymer to hydrolyze nerve gas, may be applied thereto so that the activated carbon particles and fibers form a second line of defense.

The fabric material of the present invention has a wide variety of uses. It is useful for protective purposes and for filtration and separation of gases and liquids. The uses include the manufacture of the fabric material into wearing apparel, e.g. military uniforms, blankets, sleeping bags, bedding, surgical dressings, wrappers and containers, covers, tarpaulins, tents, curtains, gas masks, paint spraying masks, air-conditioning duct filers, flue gas deodorizers and the like.

In general when fibers of the instant invention are employed having in combination CSF and TS values of less than two-hundred and five pounds per inch, it has been found that up to about one half of the resulting fibers weight can conveniently comprise activated carbon either in fiber or powder form. When the CSF value is reduced to below about 100, even higher loadings can be obtained. In increasing desirability the activated carbon component of the fabric system can comprise more than one half to three fourths of the fabric, by weight, and most desirably to in excess of sixth seventh and even seven eighths of the total fabric weight. Additionally, major proportions of other fibers (i.e. glass up to about two fifths, by weight) and materials may be incorporated to provide other desirable qualities to the fabric.

In addition to the critical parameters of the fibrillated fiber of the instant invention, the fibers are further characterized by the following examples and related graphs and photomicrographs derived therefrom which are provided for illustration only and are not to be construed as limitations on the present invention except as set forth in the appended claims. All parts and percentages are as defined above unless otherwise specified.

EXAMPLE 1

(Comparative Basis)

A commercial Waring blender having a capacity of one gallon in the blending chamber was modified by providing about a 0.25 mm break edge on the working edges of the blade. Next a slurry of an acrylic fiber, about 0.56%, by weight, was made up in two liters of water to which was also added 2 ml of a solution of 0.1 mg/100 ml of Aerosol ® OT-75. The particular fiber, having a molecular weight of about 58,000, used was that sold by American Cyanamid Company under the designation of T-98 and had an acrylonitrile content of 89.2% and a methyl methylacrylate content of 10.8%. The staple before processing had a length on average of about three-eighths inch and a denier of about 5.4. The suspension was then charged to the blender and was then processed for a period of forty-five minutes. Aliquotes were removed from the process slurry at 15, 25, 35, and 45 minutes and the temperature of the slurry was noted. The resulting fibrillated fiber from each aliquote was evaluated for CSF and TS as indicated in the body of the specification above. In particular, TS was made on a 100% sheet of 50.9 g/m$^2$ basis weight formed by adding about 0.63 grams (Dry) of the fibrillated fiber in 200 ml water to a 12.5 cm 1D Buchner funnel containing a liner of No. 1 Whatman filter paper under vacuum. Once the test sheet was separated from the liner and dried, it was cut into one inch strips and evaluated.

The resulting data is set forth in Table 1 and is graphically depicted in FIG. 1. As will be seen CSF values of the normalized plot were within the range of about five to seven hundred. The single point at thirty-five minutes is believed to be an anomaly and in any event had a value in excess of 225. Additionally provided as FIGS. 2, 3, 4 and 5 are photomicrographs of the resulting fibrillated fibers corresponding respectively to the 15, 25, 35 and 45 minute aliquotes each magnified to the same scale (note reference for scale comparison) showing the results of the fiber processing.

EXAMPLE 2

The procedure of Example 1 was repeated with the following modifications:
a) The Waring blender was fitted with a water cooling device such that the temperature of the slurry could be maintained between 24° C. and 30° C. during processing.
b) The blender was charged with a slurry containing 21 grams of fiber in three liters of water (i.e. consistency 0.7%) to which was added 1 ml of the dispersant solution.
c) The blender was operated in the low speed mode for ninety minutes and aliquotes and temperature readings were taken after the 20th, 35th, 60th, 75th and 90th minute of processing, which samples were evaluated as before.

Raw data is shown in Table 1 and is graphically represented in FIGS. 6 (CSF) and 7 (TS) with FIGS. 8 through 9 being the photomicrographs of representative fibrillated fibers from the 20th through 90th minute aliquotes, respectively. As will be seen from the graphic representations of the data, the critical combinations of low Canadian Standard Freeness and high Tensile Strength were achieved with processing times greater than about one-half hour.

EXAMPLE 3

The procedure of Example 2 was repeated with the single exception (aside from processing times as shown) that a lower molecular variant (mw≈49,000) of the fiber was employed. Samples and temperatures were taken after the 50th, 70th, 90th, 110th, 130th and 150th minutes of processing. Raw data is presented in Table 1 and is graphically represented in FIGS. 13 (CSF) and 14 (TS) with FIGS. 15 through 20 being the photomicrographs of representative fibrillated fibers from the 50th through 150th minute aliquotes, respectively. As will be seen from the graphic representations of the data, the critical combination of low Canadian Standard Freeness and high Tensile Strength were achieved with processing times greater than about one hour.

EXAMPLE 4

The mixer blade of a Daymax 10 gallon mixer was modified as per the modification of the Waring blender in Example 1. The mixer tank was then charged with about seven gallons of a slurry of the same fiber and concentrations of Example 3. As will be seen from FIG. 21, a graphical representation of the raw data shown in Table 1 (running times of 2, 2½, 3, 3½ and 4 hours) at the end of four hours CST dropped to 70 and Tensile Strength was 11 lbs/inch, well within the critical limits defined herein. During the run, temperature was maintained vis-a-vis the application of about 50 lbs of ice per running hour.

TABLE 1

EXAMPLES 1-4

| Example No. | Running Time | Temp °C. | CSF ml. | Tensile lbs/inch |
|---|---|---|---|---|
| 1 | 15 min | 40 | 730 | — |
|   | 25 | 45 | 650 | — |
|   | 35 | 45 | 230 | 6.0 |
|   | 45 | 52 | 650 | — |
| 2 | 20 min | — | 290 | 2.1 |
|   | 35 | 30 | 30 | 9.4 |
|   | 60 | 26 | 29 | 9.7 |
|   | 75 | 27 | 8 | 16.3 |
|   | 90 | — | 38 | 12.9 |
| 3 | 50 min | <30 | 768 | — |
|   | 70 | <30 | 142 | 1.8 |
|   | 90 | <30 | 28 | 9.7 |
|   | 110 | <30 | 29 | 6.9 |
|   | 130 | <30 | 14 | 12.1 |
|   | 150 | <30 | 8 | 7.4 |
| 4 | 2 hrs | 26 | 750 | — |
|   | 2½ | — | 650 | — |
|   | 3 | 27 | 540 | — |
|   | 3½ | 22 | 200 | — |
|   | 4 | — | 70 | 11.4 |

EXAMPLE 5

A mixture of 14% fibrillated acrylic fibers, 18% activated carbon fiber and 68% activated carbon powder in 18 l. of water is formed into a sheet using a standard hand paper making machine. The sheet is dried under pressure at 70° C. to 120° C. The resultant fabric material is effective for the removal of toxic materials from vapor passed through it.

EXAMPLE 6

The procedure of Example 5 is again followed, except that 12% fibrillated acrylic fiber, 59% activated carbon fiber and 29% active carbon powder are employed and the paper material is embossed after forming but before drying. The resulting fabric material is effective for the removal of toxic materials from vapor passing through it.

EXAMPLE 7

The procedure of Example 6 is again followed, except that the fabric material is not embossed. After drying the material is laminated to a 65/35 polycotton fabric utilizing a commercially available acrylic foam adhesive. The resulting product is effective for the removal of toxic materials from vapor passing through it.

EXAMPLE 8

The procedure of Example 5 is again followed, except that 45% fibrillated acrylic fiber and 55% activated carbon powder are employed. No activated carbon fibers are present. The resulting fiber is effective at removing toxic materials from vapor passing through it.

EXAMPLE 9

The procedure of Example 6 is again followed, except that 6.3% fibrillated acrylic fiber and 93.7% activated carbon fiber are employed. No activated carbon particles are present. The resulting fabric material is effective at removing toxic material from vapor passing through it.

EXAMPLE 10

The procedure of Example 5 is again followed, except that 19.4% fibrillated acrylic fiber, 80% activated carbon fiber and 0.6% polytetrafluoroethylene are employed. No activated carbon powder is present. The resulting material is effective against removal of toxic vaporous material.

EXAMPLE 11

The procedure of Example 6 is employed, except that 6.3% of fibrillated acrylic fibers and 93.7% of activated carbon fibers are employed. No activated carbon powder is present. Two layers of the resultant fabric material are laminated as in Example 7. The resulting product is useful for removing toxic elements from air.

What is claimed is:

1. A non-woven fabric material comprising a wet-laid sheet containing a fibrillated, monoethylenically unsaturated monomer based fiber having a Canadian Standard Freeness of less than 100 in combination with a Tensile Strength of at least 5 pounds per inch.

2. The nonwoven fabric of claim 1 wherein said fabric is air and water vapor permeable.

3. The nonwoven fabric of claim 2 further comprising a toxic vapor absorptive agent.

4. The nonwoven fabric of claim 3 wherein said toxic vapor absorptive agent is activated carbon.

5. The nonwoven fabric of claim 4 wherein said activated carbon comprises activated carbon fiber and is present at a level of up to about one half, by weight, of said fabric.

6. The nonwoven fabric of claim 5 further comprising up to about two fifths, by weight, of said fabric of glass fibers.

7. The fabric of claim 1 wherein the fiber is an acrylic based fiber.

8. The nonwoven fabric of claim 7 wherein said fabric is air and water permeable.

9. The nonwoven fabric of claim 8 further comprising a toxic vapor absorptive agent.

10. The nonwoven fabric of claim 9 wherein said toxic vapor agent is activated carbon.

11. The nonwoven fabric of claim 10 wherein said activated carbon comprises activated carbon fiber and is present at a level greater than about one half, by weight, of said fabric.

12. The nonwoven fabric of claim 11 wherein the level of said activated carbon exceeds about three fourths, by weight, of said fabric.

13. The nonwoven fabric of claim 12 wherein the level of said activated carbon exceeds about six sevenths, by weight, of said fiber.

14. The nonwoven fabric of claim 13 wherein the level of said activated carbon exceeds about seven eighths, by weight, of said fiber.

15. An improved air, liquid and water vapor permeable, toxic vapor absorptive nonwoven fabric material comprising a wet-laid sheet containing fibrillated acrylic fiber and activated carbon, the improvement comprising said fibrillated acrylic fiber having a Canadian Standard Freeness of less than 100 in combination with a Tensile Strength of greater than 5 pounds per inch and wherein said activated carbon comprises activated carbon fiber present in said fabric at a level of about one half, by weight, of said fabric.

16. The fabric material of claim 15 further comprising about two fifths, by weight, of said fabric of glass fiber.

17. An improved air, liquid and water vapor permeable, toxic vapor absorptive nonwoven fabric material comprising a wet-laid sheet containing fibrillated acrylic fiber and activated carbon, the improvement comprising said fibrillated acrylic fiber having a Canadian Standard Freeness of less than 100 in combination with a Tensile Strength of greater than 5 pounds per inch and wherein said activated carbon comprises activated carbon fiber present in said fabric at a level greater than about one half, by weight, of said fabric.

18. The nonwoven fabric of claim 17 wherein the level of said activated carbon exceeds about three fourths, by weight, of said fabric.

19. The nonwoven fabric of claim 18 wherein the level of said activated carbon exceeds about six sevenths, by weight, of said fabric.

* * * * *